Patented Oct. 30, 1951

2,573,282

UNITED STATES PATENT OFFICE 2,573,282

PROCESS FOR THE PREPARATION OF ARTIFICIAL CRYOLITE FREE FROM SILICA

Franco Sciacca and Luigi Notarbartolo, Milan, Italy, assignors to Montecatini Societa Generale Per L'Industria Mineraria E Chimica Anonima, a corporation of Italy No Drawing. Application February 27, 1948, Serial No. 11,848. In Italy February 5, 1944

Section 1, Public Law 690, August 8, 1946
Patent expires February 5, 1964

3 Claims. (Cl. 23—88)

Our invention relates to a process for the production of artificial cryolite ($Na_3AlF_6$) from solutions of aluminum fluoride and sodium fluoride.

Processes for the production of artificial cryolite ($Na_3AlF_6$) by precipitation from solutions of aluminum fluoride and sodium fluoride are known in the art. Such processes involve, in general, reacting hydrofluosilicic acid with alumina ($Al_2O_3$) and sodium carbonate ($Na_2CO_3$) and have the serious disadvantage that the precipitated product contains silica as an impurity. Investigation into the reaction to trace the source or sources of impurities in the artificial cryolite product indicates that they originate with the soluble silica contained in the solutions, which precipitates with the cryolite.

The soluble silica found in the aluminum fluoride solution is evidently present as hydrofluosilicic acid, the solution being acid; while the silica found in the sodium fluoride solution is probably present as sodium silicate, the sodium fluoride solution being alkaline.

The precipitation of the silica with the cryolite may be represented as a result of the following reaction:

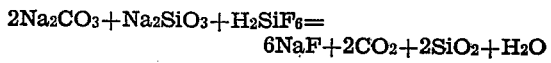

On the basis of this reaction, it has been considered that the sodium fluoride could be acidified and if necessary filtered before reacting it with the aluminum fluoride. By acidifying the sodium fluoride solution, the precipitation of silica may occur, but even if it does not occur the following reaction takes place:

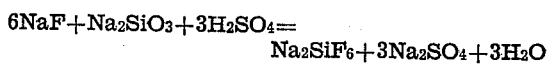

Silica, therefore, remains in solution in the form of sodium fluosilicate and in the precipitation of cryolite it remains in this form in the mother-liquor.

It is found, therefore, that the acidification of the sodium fluoride solution to a pH value approaching the pH value of the aluminum fluoride solution thus serves to permit the precipitation of cryolite which is free, or substantially free of silica. It is found further that cryolite free of silica cannot be produced either by acidifying the aluminum fluoride solution, or by adding acid to the solutions after precipitation for the reason that when silica has precipitated it is very difficult, if not impossible, to re-dissolve.

Example

The solutions of aluminum fluoride and sodium fluoride are prepared by treating hydrofluosilicic acid ($H_2SiF_6$) with alumina ($Al_2O_3$) to form aluminum fluoride solution and with sodium carbonate ($Na_2CO_3$) to form sodium fluoride solution. These solutions are prepared separately and after filtering to remove the solids they appear perfectly clear.

The sodium fluoride solution was divided into two parts, one of which was acidified with sulphuric acid ($H_2SO_4$) to bring it to a pH value of about pH 3.5. The other part is left at a pH value of about pH 8.

Two lots of artificial cryolite were prepared from the same aluminum fluoride solution but employing the acidified sodium fluoride in the production of one lot and the unacidified or alkaline sodium fluoride solution in the production of the other lot. After desiccation and calcination, the two lots were found, upon analysis, to have the following composition:

|   |   | F | Al | Na | $SiO_2$ | $Fe_2O_3$ |
|---|---|---|---|---|---|---|
|   |   | Per cent | Per cent | Per cent | Per cent | Per cent |
| A | Cryolite obtained from alkaline sodium fluoride. | 54.1 | 14.2 | 29.3 | 0.88 | 0.56 |
| B | Cryolite obtained from acidified sodium fluoride. | 54.2 | 14.0 | 30.7 | 0.14 | 0.17 |

It has thus been found that by acidifying the sodium fluoride solution prior to mixing it with the aluminum fluoride solution, the silica is retained in solution and artificial cryolite may be recovered from the aluminum fluoride-sodium fluoride reaction free or substantially free of silica.

It will be understood, of course, that the specific example set out hereinabove is merely illustrative of the operation of the process. Modifications in the operation of the process may be made by those skilled in the art, in the light of the teachings herein without departing from the spirit of the invention as defined by the appended claims.

Having now described our invention, what we claim is:

1. Method of producing artificial cryolite by reaction between an impure solution of sodium fluoride containing silica and a solution of aluminum fluoride, in which method the sodium fluoride solution containing the silica as an impurity is first acidified to a pH value of about 3.5 and then the two solutions are admixed with each other to cause reaction between them, with production and precipitation of solid cryolite, and the cryolite is then removed as a precipitate substantially free of silica.

2. Method of producing artificial cryolite by reaction between a sodium fluoride solution and an aluminum fluoride solution, each of said solutions being impure with silica, in which method the sodium fluoride solution is first acidified to a pH value of about 3.5 and then the two solutions are admixed with each other to cause reaction between them, with production and precipitation of solid cryolite, and the cryolite is then removed as a precipitate substantially free of silica.

3. Method of producing artificial cryolite, which comprises treating hydrofluosilicic acid with alumina to form aluminum fluoride solution and with sodium carbonate to form sodium fluoride solution containing silica as an impurity, acidifying the sodium fluoride solution to a pH value of about 3.5, then mixing the acidified sodium fluoride solution with the aluminum fluoride solution and reacting the mixture to precipitate cryolite which is substantially free of silica.

FRANCO SCIACCA.
LUIGI NOTARBARTOLO.

REFERENCES CITED

The following references are of record in the file of this patent:

"A Course in General Chemistry," 3rd ed., by McPherson & Henderson, page 362. Ginn & Co., N. Y., publishers.

J. W. Mellor's: "A Comprehensive Treatise on Inorganic and Theoretical Chemistry," vol. 5, 1924 ed., page 300. Longmans, Green & Co., N. Y., publishers.

"Handbook of Chemistry and Physics," 28th ed., by C. D. Hodgman, pages 336–337.